United States Patent
Yi et al.

(10) Patent No.: US 9,082,451 B2
(45) Date of Patent: Jul. 14, 2015

(54) METHOD OF DRIVING OPTICAL DISC AND OPTICAL DISC DRIVE USING THE METHOD

(75) Inventors: Ho-seok Yi, Suwon-si (KR); Yong-ho Han, Hwaseong-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 76 days.

(21) Appl. No.: 13/399,002

(22) Filed: Feb. 17, 2012

(65) Prior Publication Data

US 2013/0016595 A1  Jan. 17, 2013

(30) Foreign Application Priority Data

Jul. 15, 2011 (KR) .......................... 10-2011-0070663

(51) Int. Cl.
*G11B 15/18* (2006.01)
*G11B 19/20* (2006.01)
*G11B 7/09* (2006.01)
*G11B 19/247* (2006.01)

(52) U.S. Cl.
CPC .......... *G11B 19/247* (2013.01); *G11B 19/2063* (2013.01)

(58) Field of Classification Search
CPC .. G11B 7/007; G11B 7/24; G11B 2007/0013; G11B 7/0079; G11B 19/28; G11B 7/00745; G11B 7/00456; G11B 7/005; G11B 19/247; G11B 19/24; G11B 19/253; G11B 19/26; G11B 19/22; G11B 19/2054; G11B 19/2063

USPC ............................ 369/47.38, 215.1, 176, 266
See application file for complete search history.

(56) References Cited

U.S. PATENT DOCUMENTS

| 5,805,548 A * | 9/1998 | Ishihara et al. ............ 369/47.43 |
| 6,246,651 B1 | 6/2001 | Fukinuki et al. |
| 2002/0064110 A1* | 5/2002 | Sato ............................ 369/47.53 |
| 2005/0058033 A1* | 3/2005 | Ishii et al. .................... 369/47.5 |
| 2008/0101173 A1* | 5/2008 | Langenhuizen ........... 369/44.28 |
| 2009/0168221 A1* | 7/2009 | Baumgart et al. ......... 360/73.03 |
| 2012/0236702 A1* | 9/2012 | Chuang ...................... 369/215.1 |

FOREIGN PATENT DOCUMENTS

| JP | 09-204671 A | 8/1997 |
| KR | 1993-0008149 B1 | 8/1993 |
| KR | 1999-0045062 | 6/1999 |
| KR | 10-2001-0010679 A | 2/2001 |

OTHER PUBLICATIONS

Korean Office Action mailed Nov. 23, 2012 in counterpart Korean Application No. 10-2011-0070663 (4 pages, in Korean).

* cited by examiner

*Primary Examiner* — Wayne Young
*Assistant Examiner* — Dionne Pendleton
(74) *Attorney, Agent, or Firm* — NSIP Law

(57) ABSTRACT

A method of driving an optical disc and an optical disc drive using the method is provided. The method includes rotating an optical disc by a spindle motor, transferring an optical pickup positioned to correspond to the optical disc by driving a sled motor, and decreasing a current supplied to the spindle motor while driving the sled motor.

5 Claims, 4 Drawing Sheets

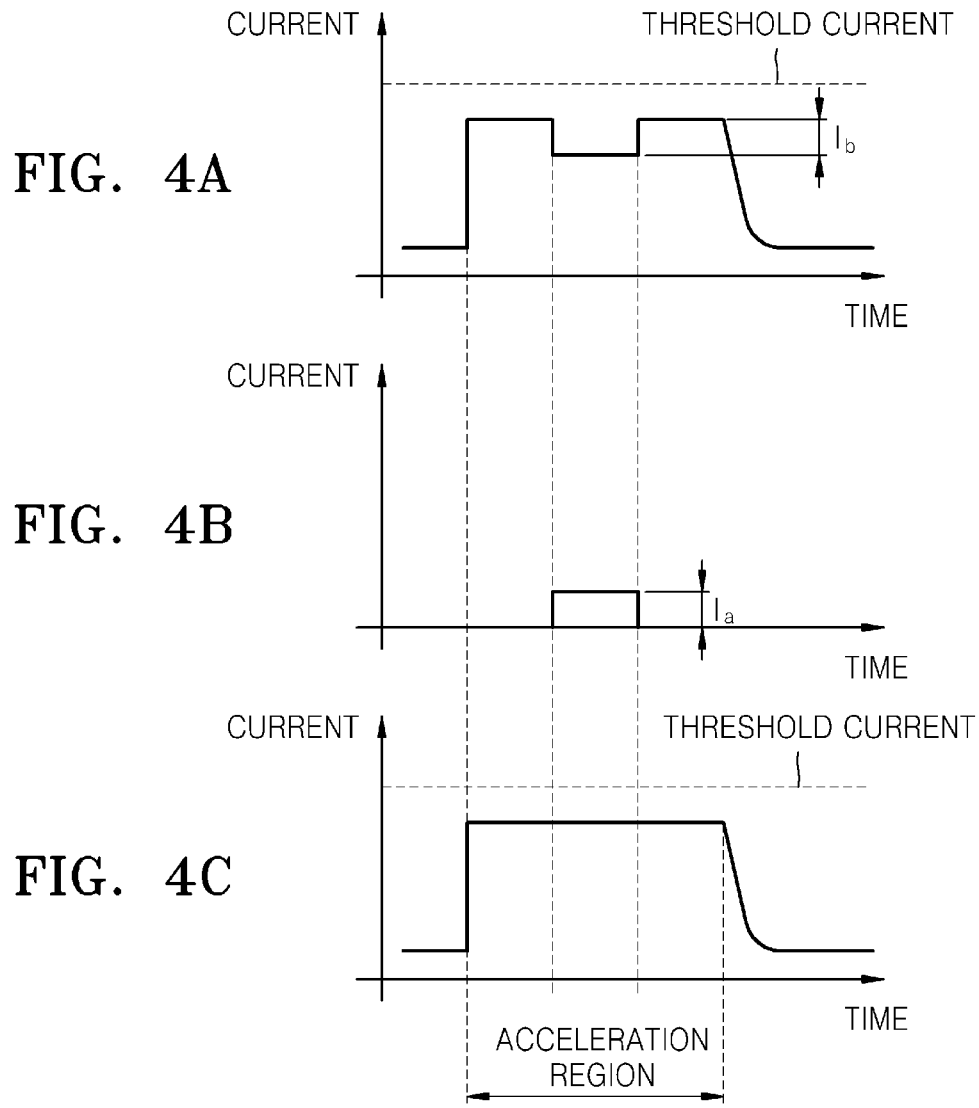

METHOD OF DRIVING OPTICAL DISC AND OPTICAL DISC DRIVE USING THE METHOD

CROSS-REFERENCE TO RELATED PATENT APPLICATION

This application claims the benefit under 35 U.S.C. §119(a) of Korean Patent Application No. 10-2011-0070663, filed on Jul. 15, 2011, in the Korean Intellectual Property Office, the disclosure of which is incorporated herein in its entirety by reference for all purposes.

BACKGROUND

1. Field

The following description relates to a method of controlling a sled motor and a spindle motor, and a drive adapting the method.

2. Description of the Related Art

Generally, when an optical disc drive drives an optical disc, a sled motor transferring an optical pickup and a spindle motor rotating the optical disc may operate in combination with each other. The sled motor and the spindle motor may be capable of operating simultaneously. Power consumption of the optical disc drive may be high when the sled motor and the spindle motor operate simultaneously. According to operational standards for optical disc drives, a maximum current supplied to the sled motor and spindle motor may be limited to a predetermined value. As such, control of the power consumption of the sled motor and the spindle motor may be required. However, access to a disc may be delayed when controlling power consumption of the sled motor and spindle motor. For example, conventional methods may prevent generation of a current peak when simultaneously driving the sled motor and the spindle motor by blocking power supplied to the spindle motor. However, there may be a time delay to reach a normal speed after supplying power to the spindle motor. As a result, there may be an operation delay of the optical disc.

SUMMARY

In one general aspect, there is provided a method of driving an optical disc, the method including rotating an optical disc by a spindle motor, moving an optical pickup positioned to correspond to the optical disc by driving a sled motor, and decreasing a current supplied to the spindle motor while driving the sled motor.

The spindle motor may be driven at a constant angular velocity.

The decreasing of the current may include controlling a total current supplied to the spindle motor and the sled motor to be smaller than or equal to a threshold current.

The spindle motor may be driven at a zoned-constant linear velocity.

The spindle motor may be driven at a zoned-constant linear velocity of which a profile thereof may have a plurality of acceleration regions.

The decreasing of the current may be performed in the plurality of acceleration regions.

A total current supplied to the spindle motor and the sled motor may be controlled to be smaller than or equal to a threshold current in the plurality of acceleration regions.

In another general aspect, there is provided an optical disc drive including a spindle motor configured to drive an optical disc, an optical pickup positioned to correspond to the optical disc, a sled motor configured to move the optical pickup, and a motor driving part configured to drive the spindle motor and the sled motor, and decrease a current supplied to the spindle motor while driving the sled motor.

The motor driving part may include a spindle motor driver configured to control the spindle motor to be driven at a constant angular velocity.

The spindle motor driver may control a total current supplied to the spindle motor and the sled motor to be smaller than or equal to a threshold current while the sled motor is driven.

The motor driving part may include a spindle motor driver configured to control the spindle motor to be driven at a zoned-constant linear velocity.

The motor driving part may drive the spindle motor at a zoned-constant linear velocity of which a profile thereof may have a plurality of acceleration regions.

The motor driving part may decrease a current supplied to the spindle motor in the plurality of acceleration regions.

In another general aspect, there is provided an optical disc drive including a spindle motor configured to drive an optical disc, an optical pickup positioned to correspond to the optical disc, a sled motor configured to move the optical pickup, a spindle motor driver configured to drive the spindle motor at a zoned-constant linear velocity of which a profile thereof comprises multistage double-speed regions and an acceleration region between the multistage double-speed regions, and a sled motor driver configured to drive the sled motor, wherein the spindle motor driver may decrease a current supplied to the spindle motor while the sled motor is driven.

The spindle motor driver may decrease the current supplied to the spindle motor in the acceleration region.

The spindle motor driver may control a total current supplied to the spindle motor and the sled motor to be smaller than or equal to a threshold current.

The spindle motor driver may control a total current supplied to the spindle motor and the sled motor to be smaller than or equal to a threshold current.

In another general aspect, there is provided an optical disc drive including a spindle motor configured to rotate the optical disc, a sled motor configured to move an optical pickup corresponding to the optical disc, and a controller configured to drive the spindle motor and the sled motor, and to control a current supplied to the spindle motor within a range in which a total current supplied to the spindle motor and the sled motor is smaller than or equal to a threshold current.

The controller may decrease the current supplied to the spindle motor while the sled motor is driven.

Other features and aspects may be apparent from the following detailed description, the drawings, and the claims.

BRIEF DESCRIPTION OF THE DRAWINGS

FIGS. 4A through 4C are graphs illustrating a method of driving an optical disc, according to another example embodiment Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
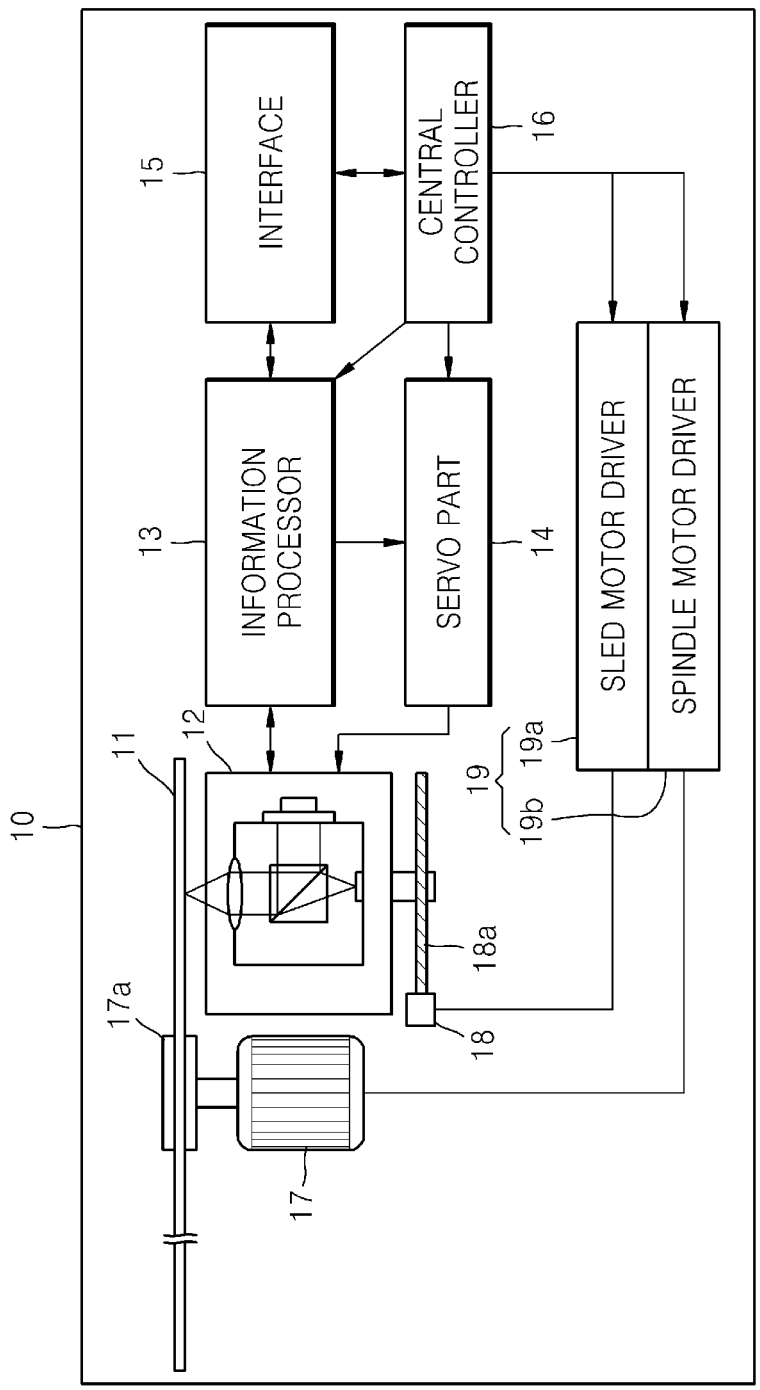
FIG. 1 is a diagram illustrating an optical disc drive according to an example embodiment.

FIG. 1 is a diagram illustrating an optical disc drive 10 according to an example embodiment.

The optical disc drive 10 may include an optical pickup 12 for reading or recording information from or on an optical disc 11. The optical pickup 12 may include, but not limited to, an optical system that includes, for example, an object lens, a laser diode (LD), and an optical detector, and additionally, a mechanic system mechanically supporting the optical system during focusing and tracking operations. The optical system may be connected to an information processor 13 that may include an encoder/decoder. The optical system may also be connected to an interface 15 for connecting the optical system to an external host. The mechanic system may be connected to a servo part 14. Meanwhile, the optical disc 11 may be installed on a spindle 17a fixed to a spindle motor 17. The optical pickup 12 corresponding to a recording surface of the optical disc 11 may be positioned at a bottom surface of the optical disc 11. The optical pickup 12 may be connected to a feeding shaft 18a rotated by a sled motor 18. The spindle motor 17 and the sled motor 18 may be connected to a motor driving part 19 which includes a spindle motor driver 19b for driving the spindle motor 17, and a sled motor driver 19a for driving the sled motor 18. The information processor 13, the servo part 14, the interface 15, and the motor driving part 19 may be controlled by a central controller 16.

The central controller 16 may be capable of controlling the driving of the optical disc 11 and the optical pickup 12 by controlling the motor driving part 19. The spindle motor 17 for rotating the optical disc 11 may be driven by the spindle motor driver 19b, and the sled motor 18 for transferring the optical pickup 12 may be driven by the sled motor driver 19a. The optical pickup 12 may be transferred in a radial direction of the optical disc 11. For example, the optical pickup 12 may be transferred in a direction crossing an information recording track of the optical disc 11.

While transferring an optical pickup to cross a track, a sled motor may be minimally controlled so that the optical pickup may be located on the track during sequential data reading. However, when a query to seek data exists, the optical pickup may be transferred to a desired track by crossing the track. In this case, power may be consumed excessively, and as a result, operations of an optical disc drive may be unstable due to a sudden voltage drop due to power consumption exceeding a predetermined value determined by general operation standards for optical disc drives. The sudden voltage drop may often occur when controlling a spindle motor to maintain constant an angular velocity like, for example, in a constant angular velocity (CAV) method. Still, the sudden voltage drop may occur more often when controlling the spindle motor to maintain not only a CAV according to zones but also acceleration between zones like, for example, in a zoned-constant linear velocity (Z-CLV) method. Generally, CAV and constant linear velocity (CLV) may be a qualifiers for the rated speed of an optical disc drive, and the Z-CLV may be a modification of the CLV for high speed CD and DVD recorders. Accordingly, in order to remove a current peak in a conventional CAV method, a current supplied to the spindle motor may be blocked during a seeking section when driving the sled motor. However, when blocking the current, the spindle motor may freely rotate while quickly reducing its speed. As such, delay may occur until the spindle motor recovers to a normal speed.

According to an example embodiment, a current may be supplied to the spindle motor 17 even in a seeking section when driving the sled motor 18. However, a current supplied to the spindle motor 17 may be controlled within a range where a total current supplied to the sled motor 18 and the spindle motor 17 does not exceed a maximum current permitted by a system. As such, the spindle motor 17 may be driven while performing a seek operation by driving the sled motor 17. Thus, a speed reduction amount of the spindle motor 17 may be low and the spindle motor 17 may quickly recover to a normal speed after the seek operation.

Figure 2A:
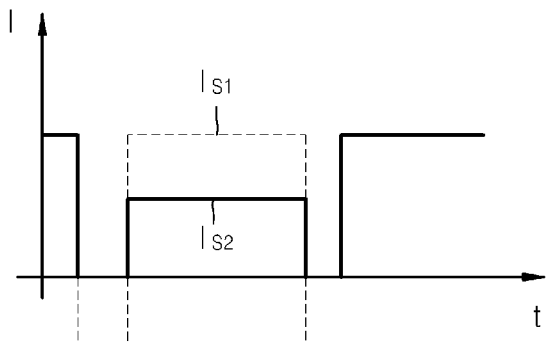
FIGS. 2A through 2C are graphs illustrating a method of driving an optical disc, according to an example embodiment.
Figure 2B:
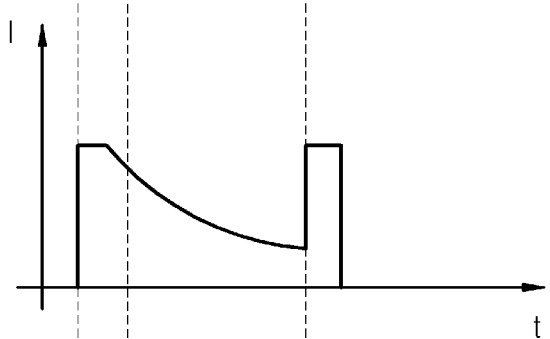
Figure 2C:
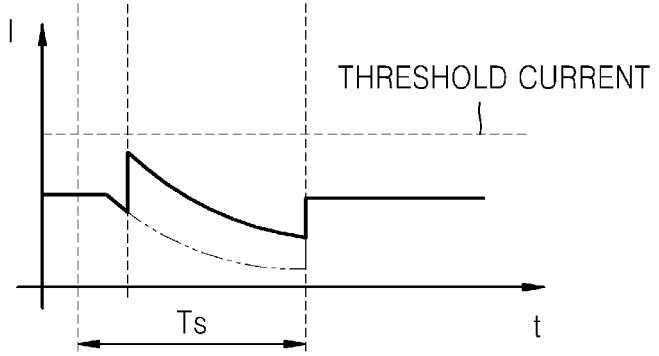

FIGS. 2A through 2C are graphs illustrating a current change during a seek operation in a CAV method. FIG. 2A is a graph illustrating current for periodically controlling a speed of a spindle motor, FIG. 2B is a graph illustrating current in a seek operation, and FIG. 2C is a graph illustrating a total current supplied to the spindle motor and a sled motor.

In the graphs of FIGS. 2A through 2C, dotted lines illustrate conventional current, solid lines illustrate current according to an example embodiment, and two-dot chain lines illustrate conventional current. With respect to an illustration of the current according to an embodiment, a current $I_{s2}$ lower than a conventional current $I_{s1}$ may be supplied to the spindle motor during a seek time Ts as shown in FIG. 2A. During the seek time Ts, if the current supplied to the sled motor has a pattern as shown in FIG. 2B, a current peak as shown in FIG. 2C may have a value smaller than or equal to a threshold current permitted by a system by supplying the current $I_{s2}$ lower than the conventional current $I_{s1}$ to the spindle motor during the seek time Ts as shown in FIG. 2A. According to the conventional methods provided in KR 2001-0010679 and U.S. Pat. No. 6,246,651 (hereinafter, respectively referred to as cited references R1 and R2), a current peak may be removed by blocking a current supplied to a spindle motor during the seek time Ts. However, as described above, since the spindle motor freely rotates at this time, the spindle motor may not be controlled and an operation delay may occur until the spindle motor stabilizes to a normal speed. Alternatively, with the current being supplied to the spindle motor during the seek time Ts according to the example embodiment, the speed of the spindle motor may be quickly and stably controlled as compared to the conventional methods provided in references R1 and R2.

Figure 3:
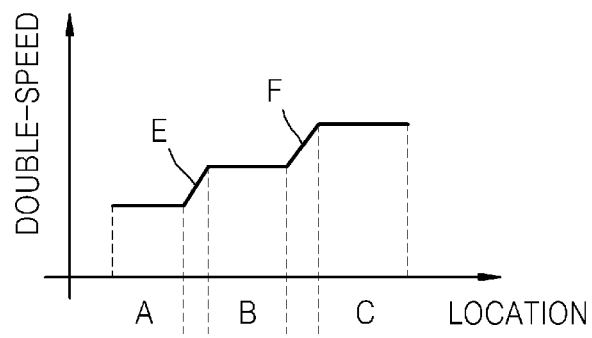
FIG. 3 is a graph illustrating a method of driving an optical disc at a zoned-constant linear velocity, according to an example embodiment.

Meanwhile, in the case of an optical disc drive using a Z-CLV method, CAV may be different according to zones, acceleration regions may exist between zones, and a current peak may occur during the acceleration regions. In other words, as shown FIG. 3, the optical disc drive using the Z-CLV method may have double-speed regions A, B, and C including 3 stages, and acceleration regions E and F between the double-speed regions A, B, and C. According to an example embodiment, current may be supplied to the spindle motor within a limited range during the Z-CLV method, and thus, an operation delay due to a free rotation of the spindle motor may be reduced.

FIGS. 4A through 4C are graphs illustrating currents supplied to a spindle motor and a sled motor in an acceleration region, and a total current supplied to the spindle motor and the sled motor. FIG. 4A is a graph illustrating current supplied to a spindle motor in an acceleration region for double-speed increase, FIG. 4B is a graph illustrating current supplied to a sled motor for track transfer, and FIG. 4C is a graph illustrating total current supplied to the spindle motor and the sled motor.

As shown in FIG. 4A, a current smaller than or equal to a reference value or threshold value may be supplied to the spindle motor in the acceleration region. Also shown in FIG. 4A, the current may be decreased to drive the sled motor as illustrated in the middle portion of the acceleration region. For example, the current may be decreased by a current reduction amount $I_b$ considering a current amount $I_a$ of the sled motor as shown in FIG. 4B. That is, the current reduction amount $I_b$ may be equal to the current amount $I_a$. Thus, according to an example embodiment, a current decreased to a value smaller or equal to a threshold value may be supplied to the spindle motor while the sled motor is driven, so that the total current supplied to the spindle motor and the sled motor in the acceleration region does not exceed a threshold current as shown in FIG. 4C.

Accordingly, since the current may be supplied continuously to the spindle motor, the speed reduction of the spindle motor may be smaller compared to the case when supply of the current may be blocked as mentioned above in the conventional method. As such, the spindle motor may quickly reach a normal speed.

According to an example embodiment, a current continuously supplied to a spindle motor without having to block the current to limit the current may reduce an operation delay. Specifically, when controlling the spindle motor to rotate at a zoned-constant linear velocity, the current supplied to the spindle motor may not be blocked. As a result, speed reduction of the spindle motor may be reduced while driving a sled motor, thereby quickly stabilizing the spindle motor in an acceleration region.

A method and an optical disc drive according to an example embodiment may be suitable for use in, but not limited to, a laptop or an external disc driver.

Accordingly, since there has been no method to remove a current peak in the Z-CLV method, and considering the methods described in the cited references R1 and R2 mentioned above, a current supplied to the spindle motor may be blocked in the acceleration regions E and F (see FIG. 3 above), but an operation delay may still occur. However, according to an example embodiment, the current may be supplied to the spindle motor within a limited range during the Z-CLV method, and thus, an operation delay due to a free rotation of the spindle motor may be reduced.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of driving an optical disc, the method comprising:
   rotating an optical disc having program zones and acceleration regions by a spindle motor driven at zoned-constant linear velocities of which a profile thereof has the acceleration regions, each of the acceleration regions being disposed between and directly contacting adjacent program zones;
   increasing a linear velocity of the spindle motor throughout each of the acceleration regions;
   reading data in the program zones in response to the increasing of the linear velocity of the spindle motor;
   moving an optical pickup positioned to contact the optical disc by driving a sled motor; and,
   decreasing a current supplied to the spindle motor while driving the sled motor such that a total current supplied to the spindle motor and the sled motor is smaller than or equal to a threshold current, wherein the current supplied to the spindle motor is decreased by an amount equal to a current supplied to the sled motor in response to the sled motor being driven.

2. The method of claim 1, wherein the total current supplied to the spindle motor and the sled motor is substantially constant during the acceleration region.

3. An optical disc drive comprising:
   a spindle motor configured to drive an optical disc having program zones and acceleration regions, each of the acceleration regions being disposed between and directly contacting adjacent program zones;
   a sled motor configured to move the optical pickup; and
   a motor driving part configured to drive the spindle motor and the sled motor, a current supplied to the spindle motor being decreased while the sled motor is being driven, a total current supplied to the spindle motor and the sled motor being smaller than or equal to a threshold current, wherein
   the motor driving part is configured to drive the spindle motor at zoned-constant linear velocities of which a profile thereof has the acceleration regions and to increase the linear velocity of the spindle motor throughout each of the acceleration regions, and
   the current supplied to the spindle motor is decreased by an amount equal to a current supplied to the sled motor in response to the sled motor being driven; and
   an optical pickup positioned to contact the optical disc and read data in the program zones in response to the increasing of the linear velocity of the spindle motor.

4. An optical disc drive comprising:
   a spindle motor configured to drive an optical disc having program zones and acceleration regions, each of the acceleration regions being disposed between and directly contacting adjacent program zones;
   a sled motor configured to move the optical pickup;
   a spindle motor driver configured to drive the spindle motor at zoned-constant linear velocities of which a profile thereof comprises multistage double-speed regions and one of the acceleration regions in which a linear velocity of the spindle motor is increased throughout between the adjacent multistage double-speed regions;
   an optical pickup positioned to contact the optical disc and read data in the program zones in response to the increasing of the linear velocity of the spindle motor; and
   a sled motor driver configured to drive the sled motor, wherein
   the spindle motor driver is configured to decrease a current supplied to the spindle motor while the sled motor is driven so that a total current supplied to the spindle motor and the sled motor is smaller than or equal to a threshold current, and
   the current supplied to the spindle motor is decreased by an amount equal to a current supplied to the sled motor in response to the sled motor being driven.

5. An optical disc drive comprising:
   a spindle motor configured to rotate the optical disc having program zones and acceleration regions, each of the acceleration regions being disposed between and directly contacting adjacent program zones;

a sled motor configured to move an optical pickup contacting the optical disc; and a controller configured to
- drive the spindle motor and the sled motor,
- to control a current supplied to the spindle motor within a range in which a total current supplied to the spindle motor and the sled motor is smaller than or equal to a threshold current, and
- to decrease the current supplied to the spindle motor by an amount equal to a current supplied to the sled motor in response to the sled motor being driven, wherein the spindle motor is configured to be driven at zoned-constant linear velocities of which a profile thereof has the acceleration regions and to increase a linear velocity throughout each of the acceleration regions, and an optical pickup positioned to contact the optical disc and read data in the program zones in response to the increasing of the linear velocity of the spindle motor.

* * * * *